United States Patent
Strassner et al.

(10) Patent No.: US 7,542,956 B2
(45) Date of Patent: Jun. 2, 2009

(54) AUTONOMIC COMPUTING METHOD AND APPARATUS

(75) Inventors: John C. Strassner, North Barrington, IL (US); Barry J. Menich, South Barrington, IL (US)

(73) Assignee: Motorola, Inc., Schaumburg, IL (US)

( * ) Notice: Subject to any disclaimer, the term of this patent is extended or adjusted under 35 U.S.C. 154(b) by 608 days.

(21) Appl. No.: 11/422,681

(22) Filed: Jun. 7, 2006

(65) Prior Publication Data

US 2007/0288507 A1 Dec. 13, 2007

(51) Int. Cl.
*G06N 5/00* (2006.01)
(52) U.S. Cl. .................. 706/46; 704/209; 704/272; 435/6; 600/518
(58) Field of Classification Search .................. 706/46; 704/209, 272; 435/6; 600/518
See application file for complete search history.

(56) References Cited

U.S. PATENT DOCUMENTS

| 6,856,942 | B2 | 2/2005 | Garnett et al. |
|---|---|---|---|
| 2004/0059966 | A1 | 3/2004 | Chan et al. |
| 2005/0034107 | A1 | 2/2005 | Kendall et al. |
| 2005/0091352 | A1 | 4/2005 | Alex et al. |
| 2005/0216793 | A1 | 9/2005 | Entin et al. |
| 2006/0112061 | A1 | 5/2006 | Masurkar |

FOREIGN PATENT DOCUMENTS

EP 1 482 444 A2 1/2004

OTHER PUBLICATIONS

"The NGOSS Technology-Neutral Architecture", TeleManagement Forum (TMF), Nov. 2005, 1-94, TMF, USA.
J. Thelin, "A Comparison of Service-Oriented, Resource-Oriented, and Object-Oriented Architectures", www.capeclear.com, 2003, 1-36, Cape Clear Software Inc., USA.
"The Architecture of Choice for a Changing World", www.omg.org/mda, 2006, Object Management Group, Inc., USA.
R. Soley, "Model Driven Architecture", OMG White Paper, Nov. 27, 2000, 1-12, Object management Group, USA.
J. Miller, et al., "Model Driven Architecture (MDA)", Architecture Board ORMSC, Jul. 9, 2001, 1-31, Object Management Group, USA.
J. Miller, et al., "MDA Guide Version 1.0.1", Jun. 12, 2003, 1-62, Object Management Group, USA.
"A Proposal for an MDA Foundation Model", ORMSC White Paper, May 4, 2001, 1-7, Object Management Group, USA.
T. Meservy, et al., "Transforming Software Development: An MDA Road Map", IEEE, 2005, 38-44, IEEE Computer Society, USA.

*Primary Examiner*—Wilbert L Starks, Jr.

(57) ABSTRACT

The disparate data and commands from are received from a managed resource (102) and have potentially different semantics. The disparate data and commands are processed according to rules received from an autonomic manager (112) to produce a single normalized view of this information. The actual state of the managed resource is determined from the normalized view of disparate data. The actual state of the managed resource (102) is compared to a desired state of the managed resource (102). When a match does not exist between the actual state and the desired state, a configuration adjustment to the managed resource (102) and/or another resource is determined to allow the actual state to be the same as the desired state. Then, the configuration adjustment is applied to the managed resource (102). When a match exists between the actual state and the desired state, maintenance functions associated with the managed resource (102) are performed.

20 Claims, 2 Drawing Sheets

AUTONOMIC COMPUTING METHOD AND APPARATUS

FIELD OF THE INVENTION

The field of the invention relates to network and element management and, more specifically, to providing management functions in autonomic systems.

RELATED APPLICATIONS

PROBLEM SOLVING MECHANISM SELCTION FACILITATION APPARATUS AND METHOD as is filed concurrently with present application using Ser. No. 11/422,671;

METHOD AND APPARATUS FOR AUGMENTING DATA AND ACTIONS WITH SEMANTIC INFORMATION TO FACILITATE THE AUTONOMIC OPERATIONS OF COMPONENTS AND SYSTEMS as is filed concurrently with present application using Ser. No. 11/422,661;

METHOD AND APPARATUS FOR HARMONIZING THE GATHERING OF DATA AND ISSUING OF COMMANDS IN AN AUTONOMIC COMPUTING SYSTEM USING MODEL-BASED TRANSLATION as is filed concurrently with present application using Ser. No. 11/422,642; wherein the contents of each of these related applications are incorporated herein by this reference.

BACKGROUND OF THE INVENTION

Autonomic computing systems are typically designed to mimic the human body's central nervous system. For instance, inputs are received by the system and the system reacts to these inputs without the need for specific inputs or control from a human user. In one example, low-level tasks of the system may be performed without the requirement of intervening highly trained human specialists. Autonomic systems may be self-configurable and self-managed, further reducing or eliminating the need for user input and/or control.

Autonomic systems typically include heterogeneous computing elements that are programmed using specific data and commands. For instance, each device in the autonomic system may be programmed using one or more distinct programming approaches (e.g., using the Simple Network Management Protocol (SNMP) or a Command Line Interface (CLI)), according to different programming models (e.g., modal and non-modal approaches) or according to different programming languages.

Because the various elements frequently utilize different programming approaches or models, management and interaction of the disparate elements becomes difficult or impossible to achieve using previous approaches. For instance, the various elements can often not share and/or communicate decisions on similar data and commands. These problems make it difficult or impossible to manage different computing elements and use different technologies to implement the various elements. Moreover, additional software and/or hardware functionality is often required for each combination of elements in the system that need to communicate with each other. Robustness and scalability problems are also often caused by the use of disparate approaches.

BRIEF DESCRIPTION OF THE DRAWINGS

The above needs are at least partially met through provision of an autonomic computing system described in the following description, particularly when studied in conjunction with the following drawings, wherein.

Figure 1:
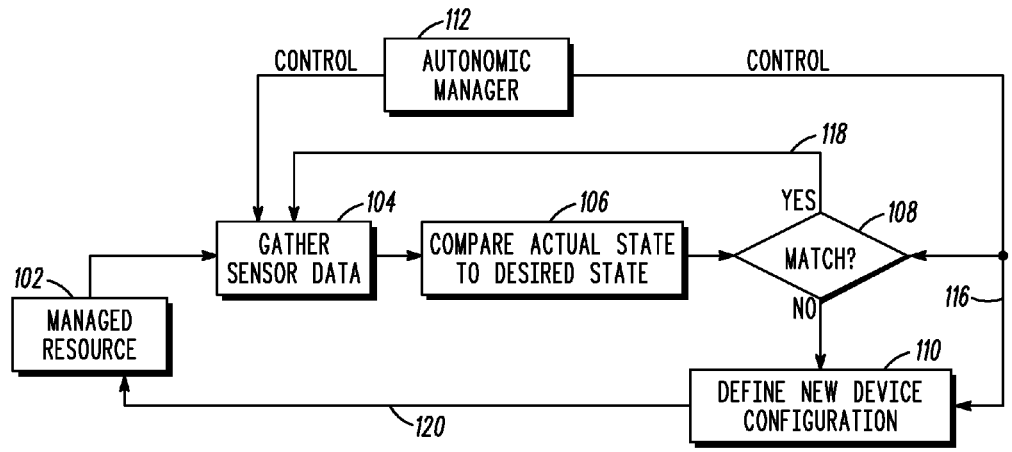
FIG. 1 is a flow chart of an approach for controlling a managed resource using an autonomic system according to various embodiments of the present invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION OF THE PREFERRED EMBODIMENTS

A system and method are provided that allow for the efficient management of components of autonomic systems using a technology-neutral architecture. This facilitates the generation of multiple technology-specific architectures and, furthermore, enables these architectures to be interoperable, since they are all based on this single technology-neutral architecture. Specifically, components of autonomic systems utilizing different programming approaches, models, or technologies may seamlessly communicate and exchange information with each other. Gathered information is constantly compared to desired operational goals of the system and/or its components so that the services and resources may be provided to system components. The services and resources may also be optimized to meet one or more metrics or requirements of the system or of the individual components and eliminate the need for additional hardware or software.

In many of these embodiments, disparate data and commands are gathered from a managed resource and have potentially different semantics. The disparate data and commands are processed according to rules received from an autonomic manager and a single normalized view of the disparate data and commands is produced. The actual state of the managed resource is then determined from the normalized view of disparate data and compared to a desired state of the managed resource.

When a match does not exist between the actual state and the desired state, a configuration adjustment to the managed resource is determined and applied to the managed resource to allow the actual state to become the same as the desired state. Alternatively, or in addition to adjusting the configuration of the managed resource, the configuration of other resources that relate to and affect the state of the managed resource may also be adjusted. On the other hand, when a match exists between the actual state and the desired state, maintenance or reconfiguration functions associated with the managed resource may be performed.

Policies (e.g., supplied by the autonomic manager) may be used in different ways within the system. For instance, the data and commands gathered from the managed resource may be chosen or governed by using a particular policy rule. In another example, the type of commands issued as part of the configuration adjustment may be determined by using another policy rule. Other examples of policies and the application of these policies within the system may are possible.

As mentioned, the data and commands may be of different formats and contexts. Once gathered, the data and commands are translated into a single normalized data form using a variety of approaches. For example, various programming approaches, object-oriented modeling approaches, and semantic knowledge techniques may be used to transform the data and commands into a normalized form. After converting the data and commands into the normalized form, the normalized information may be augmented with additional information to produce a semantic object data structure and this semantic object data structure may be stored in a memory for future use.

In some of these embodiments, when comparing the actual and desired state of the managed resource, the system may differentiate between a direct match and an indirect match. In one example, a rank-ordered set of probabilities may be determined. In another example, the comparing may facilitate the receipt of partial data.

The maintenance functions performed may include logging a match and continuing with the processing of the disparate data and commands. In addition, the maintenance functions may include executing at least one machine-based learning algorithm. In another example, executing the maintenance functions may include executing at least one reasoning algorithm for hypothesis generation and theory maintenance.

Adaptation to new formats of the disparate data and commands is also provided in the present approaches. In particular, new formats of disparate data and commands may be dynamically recognized by using approaches such as data modeling, ontology engineering, machine-base learning and reasoning, pattern recognition, and various programming methods. A plurality of dynamically changing data models are processed to perform these and other processing functions.

Various commands may be used to implement the configuration adjustment of the managed resource. In one example, a best set of configuration commands to issue to the managed resource may be determined. Furthermore, when a configuration adjustment is made to the managed resource, side effects may be identified and these side effects considered during subsequent processing. Abnormal events may also be identified and, once identified, the system may respond to the abnormal events. The configuration adjustment may also affect the configuration of other managed resources.

Thus, autonomic management approaches are provided to efficiently manage and control the functions of elements in autonomic systems. More specifically, these approaches translate information from disparate (e.g., vendor-specific) data and commands to a single normalized form so that the effect of the data on the system and managed resources in the system can be determined. In so doing, these approaches harmonize different types of knowledge representation to form a holistic representation of a concept, orchestrate and coordinate the behavior of a collection of heterogeneous computing elements, and provide a set of scalable approaches that can be adapted to the needs of specific applications. These approaches also provide for a autonomic computing architecture with the above-mentioned features.

Referring now to FIG. 1, one example of an approach for controlling a managed resource using an autonomic system is described. At step 104, sensor data and commands are gathered from a managed resource 102. Although only one managed resource is shown in the example of FIG. 1, it will be understood that any number of managed resources may be present.

At step 106, a comparison operation is performed that makes a comparison between the actual state of the managed resource 102 and the desired state of the managed resource 102. At step 108, it is determined whether a match exists. If the answer at step 108 is affirmative, a maintenance control loop 118 is followed where a maintenance action or maintenance actions are performed on the managed resource 102. If the answer is negative, at step 110, a new device configuration is defined and control actions 120 are performed on the managed resource 102. The device configuration is applied to the managed resource 102 to change the actual state to the desired state.

An autonomic manager 112 uses control lines 114 and 116 to supply control information to the various steps 104, 108, and 110, and control data to the process 104. For example, the autonomic manager 112 may supply various sets of policies for use in choosing data and commands received. In another example, the policies may be used to determine the commands used to make the configuration adjustment by the step 110 and control action 120.

As shown in FIG. 1, the autonomic manager 112 uses two control loops to govern the managed resource 102. A first control loop performs maintenance functions when a match between the actual and desired state of the managed resource is found. A second control loop is used to determine a configuration adjustment to the managed resource when a match between the actual and desired states of the managed resource is not determined. In one example, it is determined whether the desired state and the actual state are exactly equal (an equality test). Alternatively, the matching step may determine if a fuzzy match (a fuzzy match test) or a similarity match (having a value that equals or exceeds a predetermined threshold, for example) exists. Other forms of equality tests, fuzzy match tests, and probability tests are possible.

The disparate data and commands received from the managed resource 102 may have different formats, syntax, semantics and be produced in dissimilar contexts. Consequently, the disparate data and commands may be translated at step 104 into a single normalized data form using a variety of programming approaches such as object-oriented modeling approaches and by using semantic knowledge.

When step 106 is performed, the single normalized data form may be augmented with additional information to produce a semantic object data structure and this semantic object data structure may be stored in a memory. Performing step 106 may also include differentiating between a direct match and an indirect match. In this regard, the comparing performed at step 106 may include determining a rank-ordered set of probabilities and may facilitate the receipt of partial data. Specifically, the production of the rank-ordered set of probabilities facilitates the ability to reason about the data and infer a match when no direct match exists. It also enables the recognition of the receipt of partial data, such as the receipt of incomplete or truncated data, or the rejection of some of the data as being corrupted or faulty. This ability to define partial data enables the autonomic system to realize that the captured data is incomplete, and, hence, conclusions drawn from the data may be faulty. The ability also allows the system to understand which parts of the captured data are incomplete, so that it may either attempt to retrieve the missing data, or attempt to retrieve additional data that would enable the missing data to be inferred.

When a configuration adjustment is determined (e.g., at step 110), various commands may be formed to implement the configuration adjustment and, specifically, a best set of configuration commands to issue may be determined. When made, the configuration adjustment may alter the performance of other managed resources besides the managed resource 102.

As mentioned, various types of maintenance functions can be performed when a match is determined to exist. For example, the match may be logged and the processing of the disparate data and commands may continue uninterrupted. In another example, one or more machine learning algorithms may be executed. In still another example, a reasoning algorithm for hypothesis generation and theory maintenance may be executed.

Adaptation to new formats of the disparate data and commands is also supported. For instance, new formats of disparate data and commands may be dynamically recognized and categorized by using data modeling, ontology engineering, machine-base learning and reasoning, and/or programming methods. In addition, abnormal events and responding to the abnormal events may be detected and taken into account during future processing.

Figure 2:
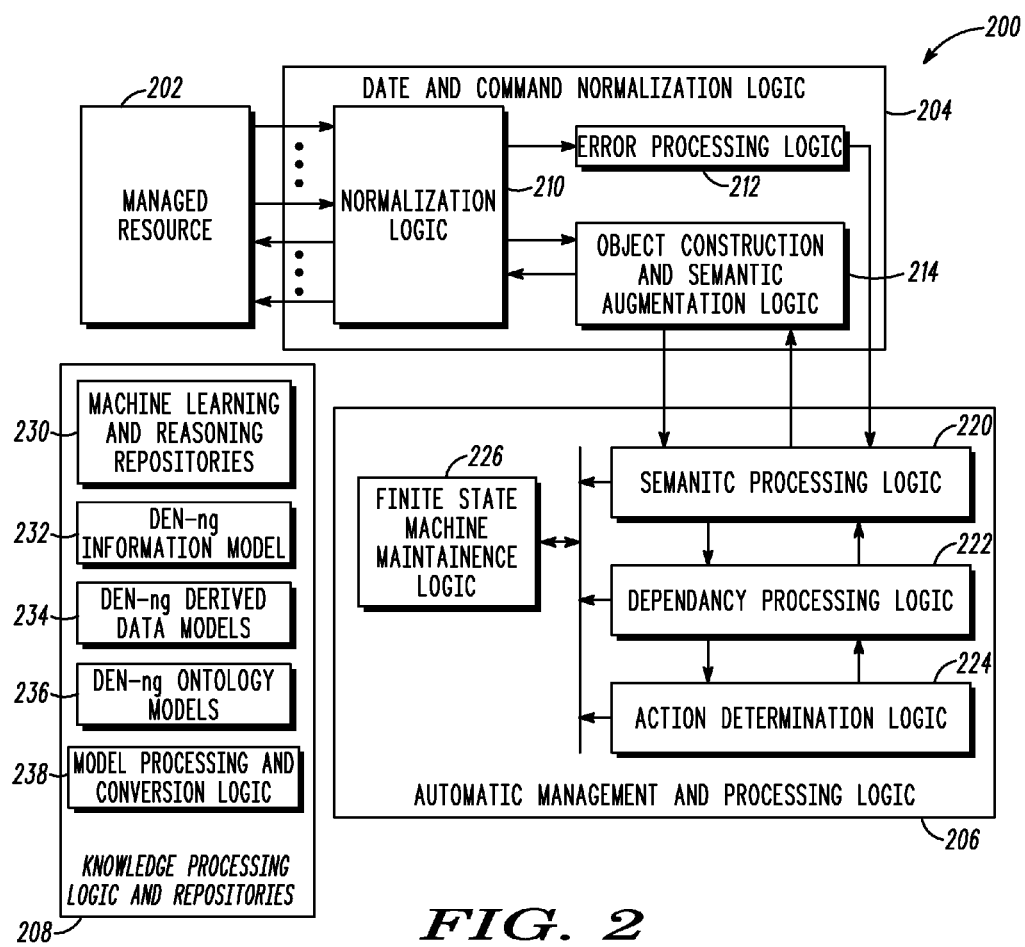
FIG. 2 is a block diagram of an autonomic system according to various embodiments of the present invention.

Referring now to FIG. 2, one example of an autonomic machine or system 200 is described. The system 200 includes a managed resource 202, data and command normalization logic 204, autonomic management and processing logic 206, and knowledge processing logic and repositories 208.

The data and command normalization logic 204 includes normalization logic 210, error processing logic 212, and object construction and semantic augmentation logic 214. The autonomic management and processing logic 206 comprises semantic processing logic 220, dependency processing logic 222, action determination logic 224, and finite state machine maintenance logic 226. The knowledge processing logic and repositories 208 comprises machine learning and reasoning repositories 230, a Directory Enabled Networks (DEN)-ng information model 232, DEN-ng derived data models 234, DEN-ng ontology models 236, and model processing and conversion logic 238.

The data and command normalization logic 204 accepts data having different formats and contexts from a set of specified devices that can be heterogeneous, for example, in both functionality and vendor. In one example, the data and command normalization logic 204 implements the functions of step 104 of FIG. 1. The data and command normalization logic 204 then produces a single normalized form of the data and performs any required processing (e.g., filter and correction function processing) as specified by the autonomics manager 112, for example, by using a set of policies obtained from the autonomics manager 112.

The data and command normalization logic 204 ensures that an autonomic architecture can meet the needs of vendor-specific technologies and devices without affecting the rest of the elements in the system. The data and command normalization logic 204 also uses the knowledge processing logic and repositories 208 to access different models and knowledge in order to produce objects in a normalized form that correspond to received data and events.

The autonomic management and processing logic 206 accepts normalized events and data from the data and command normalization logic 204 and uses this information to determine whether the actual state of managed resource 202 matches the desired state of the managed resource 202. In one example, autonomic management and processing logic 206 implements the functions of steps 106 and 108 of FIG. 1. When the actual and desired states match, then the autonomic management and processing logic 206 may log the match and continue processing. If the actual and desired states do not match, then autonomic management and processing logic 206 determines the set of configuration adjustments required to transition the state of the managed resource 202 to the desired state of the managed resource 202. Changing states of the managed resource 202 may affect other states of other entities (e.g., other managed resources).

The autonomic management and processing logic 206 also accesses different data models and knowledge in the knowledge processing logic and repositories 208 in order to determine make any necessary configuration changes. In this regard, the autonomic management and processing logic 206 implements steps 110 and 120 of FIG. 1.

The knowledge processing logic and repositories 208 hold different types of static and dynamic information that is used by the system to make decisions. In this regard, the knowledge processing logic and repositories 208 may comprise a collection of dynamic knowledge bases that can grow and shrink in size and content as required. The knowledge processing logic and repositories 208 are connected by buses (not shown) to the other components of the autonomic system 200.

As mentioned, the data and command normalization logic 204 includes normalization logic 210, error processing logic 212 and object construction and semantic augmentation logic 214. The normalization logic 210 translates vendor-specific data and commands in multiple distinct formats having the same or different content representations into a single normalized form using a combination of various programming methods, object-oriented information modeling and semantic modeling. The single normalized format allows different devices and computing systems using different languages to communicate with each other by defining a common communication and control mechanism.

The normalization logic 210 also allows the system to adapt to new data and information formats. Consequently, a single computing system can receive data from and issue commands to different devices, even if those devices cannot directly communicate with each other. Further, the normalization logic 210 facilitates the use of one or more policies governing its processing logic that is independent of the underlying implementation. In addition, the normalization logic 210 facilitates the use of machine learning and reasoning techniques to actively observe the processes, and based upon those observations, adjust other control and management processes of the autonomic system.

The normalization logic 210 performs similar functions in reverse order for effectors (e.g., devices that are managed). For example, the normalization logic 210 translates information from the common form used by the autonomic system to vendor-specific commands, and then issues those to a variety of devices that it controls. Duplicate events and/or data may be removed once normalization has been accomplished.

The error processing logic 212 detects abnormal situations in received data or events. This element may also perform other types of semantic analysis on the data.

Once the data and events are converted into a normalized form, the object construction and semantic augmentation logic 214 determines if the received data includes a sufficient amount of intrinsic information so that it can be successfully used or if additional knowledge must be retrieved in order to augment or translate the data. In this regard, the object construction and semantic augmentation logic 214 augments the received data as needed. For example, a received Simple Network Management Protocol (SNMP) alarm may be converted into a set of information model objects. If this alarm has been received before, the system may decide to ignore it. However, if this alarm has not been received before, then the system may decide to examine it to determine its relevance to the current business and operation goals of the system. In this regard, the received SNMP alarm may need to be associated with additional information such as with the identities of customers having service level agreements that are violated. These additional pieces of information are not part of the intrinsic SNMP alarm. Hence, the object construction and semantic processing logic 214 tags these objects so that the semantic processing logic 220 can link these concepts together.

Normalized information is then sent to the semantic processing logic 220 (within the autonomic management and processing logic 206). The semantic processing logic 220 provides a set of mechanisms that augment events and data received from a managed resource with additional semantic knowledge from information models as well as from a set of ontologies. The semantic processing logic 220 identifies managed objects from received events/data as well as deduces the existence of previously unknown managed objects and then augments these identified objects with additional semantic information, producing a semantic object data structure that contains the original data and applicable semantic data (both in object-form).

The semantic object form or data structure allows for more efficient and timely decision making by the system and has as attached semantic meaning or set of meanings. For example, the semantic object data structure enables the system to more quickly determine the relevance of a given event or data, as well as identify other managed elements that may be affected by the particular event or data received. The semantic processing logic 220 may further dynamically incorporate new knowledge that can be used to augment future events and data. The semantic object form also supports determining an existence of a problem, forming a hypothesis of a cause of the problem, and determining a course of action to correct the problem.

The semantic processing logic 220 may additionally include a confidence feature that enables the system to establish a relative degree of validity for receiving correct information from a given managed element, as well as for assessing how well the managed element responds to commands from the autonomic manager. This confidence determination function enables the approaches used for establishing semantic equivalence and augmenting semantic information to be fine-tuned to suit the needs of the application. The confidence determination ability also enables the algorithms to be fine-tuned to accommodate trends observed by machine learning processes as well as hypotheses produced by various types of knowledge-based reasoning algorithms.

The output of the semantic processing logic 220 comprises a set of managed entities that may need to have their configurations changed in potentially different ways. However, since the managed elements are networked together, the autonomic manager needs to or may choose to examine all managed entities that are associated with the managed entities that are about to have their configurations changed to ensure that no adverse effects will be propagated through the system.

In this regard, the dependency processing logic 222 determines the full set of dependencies in the managed entities' output by the semantic processing logic 220 as defined in the information model as well as the applicable ontologies that are relevant for the context of the operation. The dependency processing logic 222 also ensures that dependencies are resolved into the smallest set of managed element changes possible. Further, it ensures that the set of managed element changes are sent in a coordinated fashion to ensure that the system achieves its desired state. The function of the dependency processing logic 222 can be fine-tuned through policies received from the autonomic manager 112.

The action determination logic 224 determines the set of data and/or events that will guarantee that a given change was made correctly or incorrectly. This determination is supported by appropriate use of the knowledge processing logic and repositories 208. The action determination logic 224 additionally ensures that the semantics of the changes are taken into account during the processing. For example, it may be determined whether to check the output of a change immediately after the commands were sent to the device or whether its results cannot (or should not) be checked until other changes are sent. In another example, it is determined whether a change affects other managed entities, which in turn determines whether the change can be easily reversed. The action determination logic 224 also ensures a strategy for determining the success and failure of each change as well as changes to the entire system.

The knowledge processing logic and repositories 208 contain a multiplicity of different knowledge bases along with logic to translate between their native storage representation and the normalized structure used in the autonomic processing system. Since the types of information may be different, different storage and query structures may be used for different applications. Consequently, a multiplicity of knowledge repositories are used to ensure that data can be represented in as natural and an efficient format as possible. Conversion logic then translates each of these different forms into a single harmonized or normalized data form (i.e., normalized data) for scalability and efficiency purposes.

As mentioned, the knowledge processing logic and repositories 208 comprises machine learning and reasoning repositories 230, DEN-ng information model 232, DEN-ng derived data models 234, DEN-ng ontology models 236, and model processing and conversion logic 238. Alternatively, other types of information models may also be used.

The DEN-ng information model 232, DEN-ng derived data models 234, and DEN-ng ontology models 236 include, respectively, information models, data models, and ontology models according to the DEN-ng methodology. These models are necessary because management information is inherently different, requiring different storage and query structures for different applications. The DEN-ng information model 232 serves as a reference model for defining the static characteristics and behavior of managed entities in a technology-neutral form. The DEN-ng derived data models transform the information provided in the DEN-ng information model 232 into one or more technology specific formats. This transformation will, in general, not include all of the information and relationships that are present in the DEN-ng information model 232. Hence, the system needs both the DEN-ng information model 232 and the DEN-ng data models 234 in order to be able to add in semantics to received information. The DEN-ng ontology models 236 serve to augment information from the DEN-ng information model 232 and the DEN-ng data models 234. In other words, the DEN-ng information model 232 and DEN-ng data models 242 provide factual information to the system. The DEN-ng ontology models 236 expand the factual information into concepts, thereby enabling the system to reason about the facts and produce inferences about the received data. Finally, the normalized data and semantic object data structure are stored in a local memory associated with the autonomic management and processing logic 206 and/or the DEN-ng data models 234.

The machine learning and reasoning repositories 230 are used to store programs and data that are required by the one or more machine learning and one or more machine reasoning algorithms used in the autonomic management and processing logic 206. In addition, data that is valuable throughout the session or for future sessions may be able to be stored in the machine learning and reasoning repositories 230.

The model processing and conversion logic 238 is used to enable data from each of the one or more repositories in the knowledge processing logic and repositories 208 to be translated into a common normalized form. This allows the autonomic management and processing logic 206 to only have to process one common representation of information, regardless of the type or source of the information.

Figure 3:
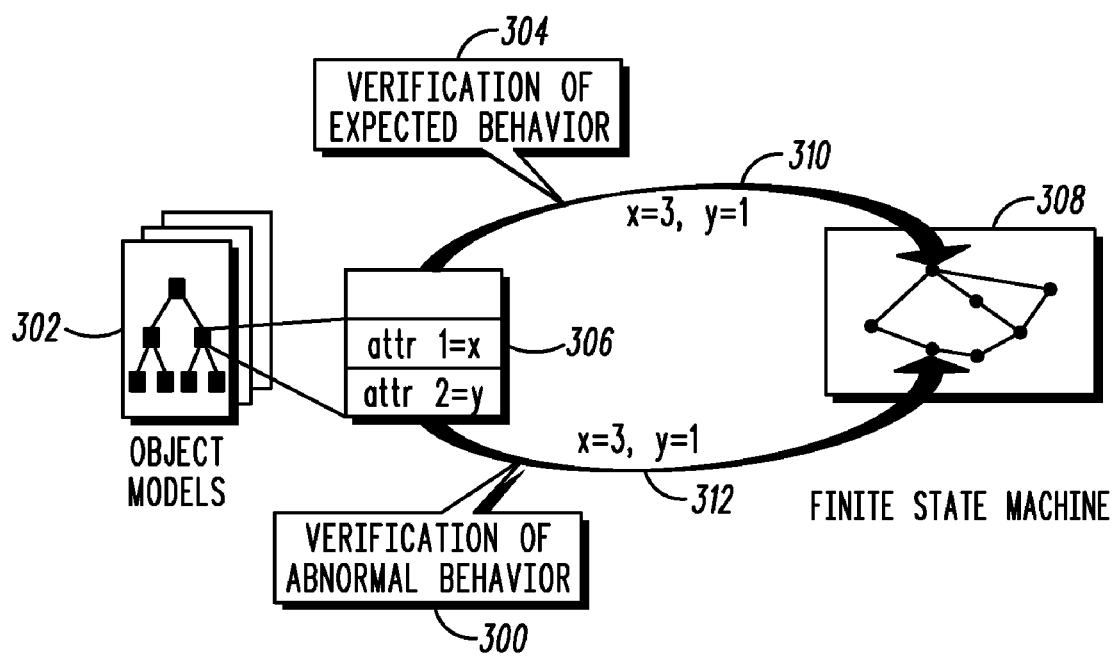
FIG. 3 is a block diagram of an approach for controlling a finite state machine according to various embodiments of the present invention.

Referring now to FIG. 3, one example of an approach for controlling the operation of managed elements using a finite state machine is described. The autonomic manager uses one or more state machines 308 to represent and orchestrate the behavior of one or more managed elements. In this approach, information defined in the information model, data models and/or ontologies (collectively represented as object models 302) are used to populate a finite state machine 308. The present approach enables changes in the functionality and/or state of a managed entity to be represented as state transitions. Consequently, the behavior of the managed element can be controlled by controlling the state transitions.

Specifically, the behavior of a managed element can be mapped to a particular state in a finite state machine 308. For instance, configuration parameters 306 can be applied to the machine 308 and expected behavior can be verified at step 304 and abnormal behavior can be detected at step 300. Consequently, faults as well as correct operation of the system can be represented as different states of the machine 308. This approach can be expanded to include a set of finite state machines that can be nested and created/destroyed dynamically at runtime to model the behavior of a set of managed entities in varying amounts of detail.

Thus, approaches are provided that allow for the efficient management of components of autonomic systems using a technology-neutral architecture. Specifically, components of autonomic systems utilizing different programming approaches, models, or technologies may easily and efficiently communicate and exchange information with each other. In so doing, these approaches coordinate the behavior of a collection of heterogeneous computing elements, and provide a set of scalable approaches that can be adapted to the needs of specific applications.

Those skilled in the art will recognize that a wide variety of modifications, alterations, and combinations can be made with respect to the above described embodiments without departing from the spirit and scope of the invention, and that such modifications, alterations, and combinations are to be viewed as being within the scope of the invention.

What is claimed is:

1. A method of realizing an autonomic computing architecture comprising:

gathering disparate data and commands, the disparate data and commands from a managed resource, the disparate data and commands having potentially different semantics;

processing the disparate data and commands according to rules received from an autonomic manager and producing a single normalized view of the disparate data and commands;

determining an actual state of the managed resource from the normalized view of disparate data;

comparing the actual state of the managed resource to a desired state of the managed resource;

when a match does not exist between the actual state and the desired state, determining a configuration adjustment to at least one of the managed resource and another resource to allow the actual state to be the same as the desired state and applying the configuration adjustment to the managed resource; and when a match exists between the actual state and the desired state, performing maintenance functions associated with the managed resource.

2. The method of claim 1 further comprising choosing the disparate data and commands by using at least one policy rule.

3. The method of claim 1 wherein determining a configuration adjustment comprises issuing commands, the commands determined at least in part by at least one policy rule.

4. The method of claim 1 wherein gathering the disparate data and commands comprises accepting data and commands having different formats and contexts; and wherein processing the disparate data and commands comprises translating the disparate data and commands into a single harmonized data form using a plurality of programming approaches, object-oriented modeling, and semantic knowledge.

5. The method of claim 1 wherein comparing comprises accepting the single harmonized data form, augmenting the single harmonized data form with additional information to produce a semantic object data structure, and storing the semantic object data structure in a memory before the comparison is made.

6. The method of claim 1 wherein the comparing comprises a test selected from a group comprising an equality test, a probability-based test, and a fuzzy match test.

7. The method of claim 6 wherein the comparing comprises determining a rank-ordered set of probabilities.

8. The method of claim 1 wherein the comparing facilitates the determination of the receipt of partial data, the partial data being comprised of data selected from a group comprising incomplete data and faulty data.

9. The method of claim 1 wherein performing maintenance functions comprises logging a match and continuing processing of the disparate data and commands.

10. The method of claim 1 wherein performing the maintenance functions comprises executing at least one machine learning algorithm.

11. An autonomic machine comprising:

data and command normalization logic for accepting disparate data and commands from at least one sensor interface and forming normalized data from the disparate data and commands;

knowledge processing logic and repositories; and autonomic management and processing logic coupled to the data and command normalization logic and the knowledge processing logic and repositories, the autonomic management and processing logic adapted to dynamically determine semantic meaning of the normalized data, form a semantic object data structure from the normalized data, and store the semantic object data structure in the knowledge processing logic and repositories, and the semantic management and processing logic being further adapted to determine an action to take on a managed resource based upon an actual state of the managed resource as determined from the semantic object data structure.

12. The autonomic machine of claim 11 wherein the data and command normalization logic comprises means for accepting data and commands having different formats and context, and means for translating the disparate data and commands into a single harmonized data form using a plurality of programming approaches, object-oriented modeling, pattern recognition, and semantic knowledge.

13. The autonomic machine of claim 12 wherein the autonomic management and processing logic comprises means for augmenting the single harmonized data form with additional information, thereby transforming the information to a semantic object data structure.

14. The autonomic machine of claim 11 wherein the knowledge processing logic and repositories comprise a plurality of knowledge bases.

15. A method of managing a resource comprising:
receiving disparate data and commands in a plurality of formats and responsively forming a normalized form;
converting the normalized form into a semantic object form, the semantic object form comprising a plurality of objects having an attached semantic meaning or set of meanings; and
applying the semantic object form to a finite state machine, the finite state machine adapted to control a managed resource based upon a content of the semantic object form.

16. The method of claim 15 wherein applying the semantic object form results in at least one action, the at least one action selected from a group comprising performing a maintenance action associated with the managed resource and adjusting a configuration of at least one of the managed resource and another resource.

17. The method of claim 15 further comprising responding to changes in data dynamically by adjusting the control of the managed resource.

18. The method of claim 15 wherein forming a normalized form comprises performing a comparison operation between an actual and desired state of a managed resource using the normalized form, and wherein the comparison operation is governed by at least one policy rule received by the autonomic manager.

19. The method of claim 15 wherein applying the semantic object form supports determining an existence of a problem, forming a hypothesis of a cause of the problem, and determining a course of action to correct the problem.

20. The method of claim 19 wherein a plurality of machine-based reasoning and learning algorithms are used for maintenance and reconfiguration operations.

* * * * *